United States Patent
Ohtani

[11] 3,835,963
[45] Sept. 17, 1974

[54] FRICTION PIECE FOR BICYCLE RIM BRAKES

[75] Inventor: Kiyoshi Ohtani, Ageo, Japan

[73] Assignee: Bridgestone Cycle Industry Co., Ltd., Tokyo, Japan

[22] Filed: Oct. 11, 1973

[21] Appl. No.: 405,600

Related U.S. Application Data

[63] Continuation-in-part of Ser. No. 227,467, Feb. 18, 1972, , which is a continuation of Ser. No. 4,343, Jan. 20, 1970, abandoned.

[52] U.S. Cl............. 188/73.1, 188/24, 188/73.5, 188/250 B, 192/30 V, 192/107 M
[51] Int. Cl............................................. F16d 65/02
[58] Field of Search....... 188/24, 73.1, 73.5, 205 A, 188/250 B, 250 E; 192/30 V, 107 M; 181/33 Q, 33 A

[56] References Cited
UNITED STATES PATENTS

| | | |
|---|---|---|
| 1,716,090 | 6/1929 | Schmidt........................... 188/250 E |
| 3,188,418 | 6/1965 | Pino.................................. 188/24 X |

FOREIGN PATENTS OR APPLICATIONS

| | | |
|---|---|---|
| 1,073,298 | 3/1954 | France.......................... 188/250 B |

*Primary Examiner*—George E. A. Halvosa
*Attorney, Agent, or Firm*—Fleit, Gripple & Jacobson

[57] ABSTRACT

A friction piece for bicycle rim brakes, consisting of an elongated rubber body, e.g., with a trapezoidal lateral cross section. The body has a planar frictional contact surface engageable with a bicycle rim and a plurality of mutually spaced lateral holes which are bored in said body in the proximity of the frictional contact surface. A planar edge surface is formed on that part of each lateral hole which is closest to the frictional contact surface, said planar edge extending in parallel to the frictional contact surface with a distance of 2 mm or more therefrom.

7 Claims, 12 Drawing Figures

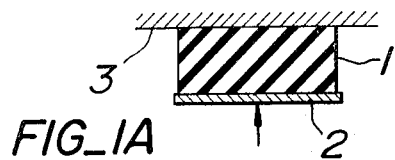
FIG_1A
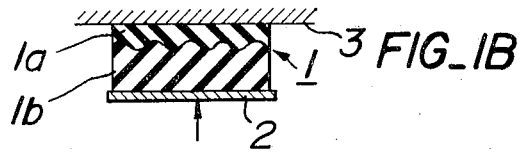
FIG_1B
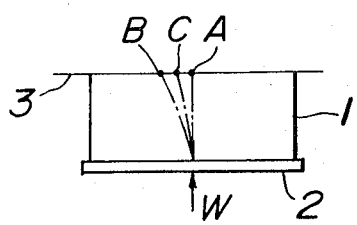
FIG_2
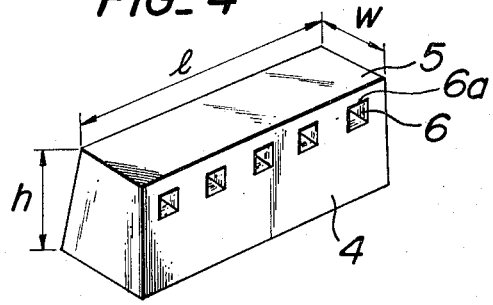
FIG_4
FIG_3
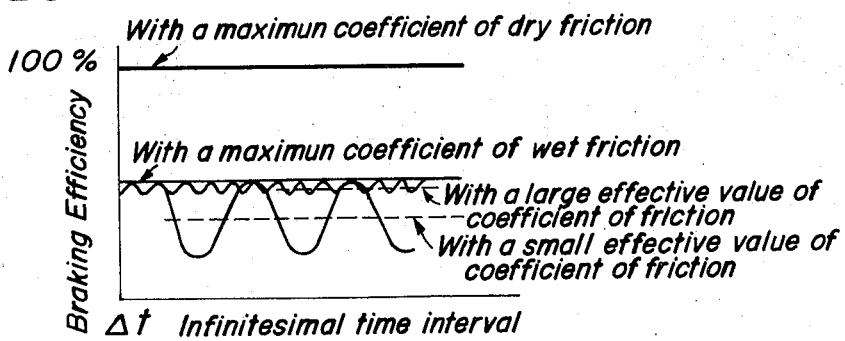
FIG_5A
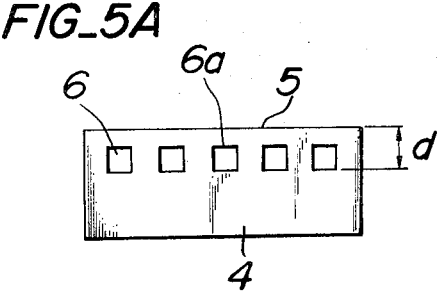
FIG_5C
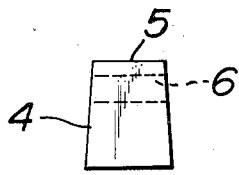
FIG_5B
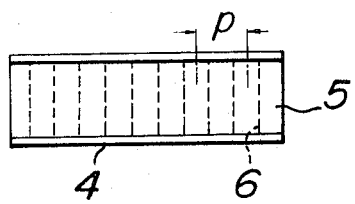

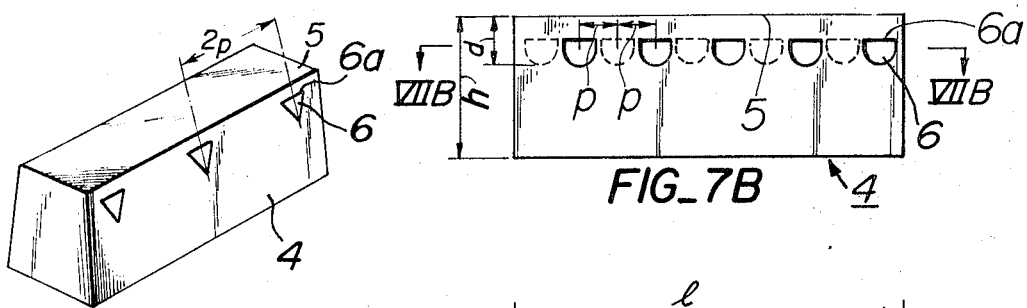
FIG_6  FIG_7B
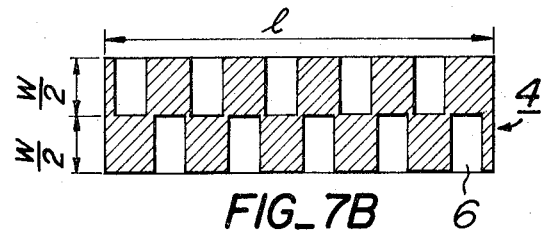
FIG_7B
FIG_8
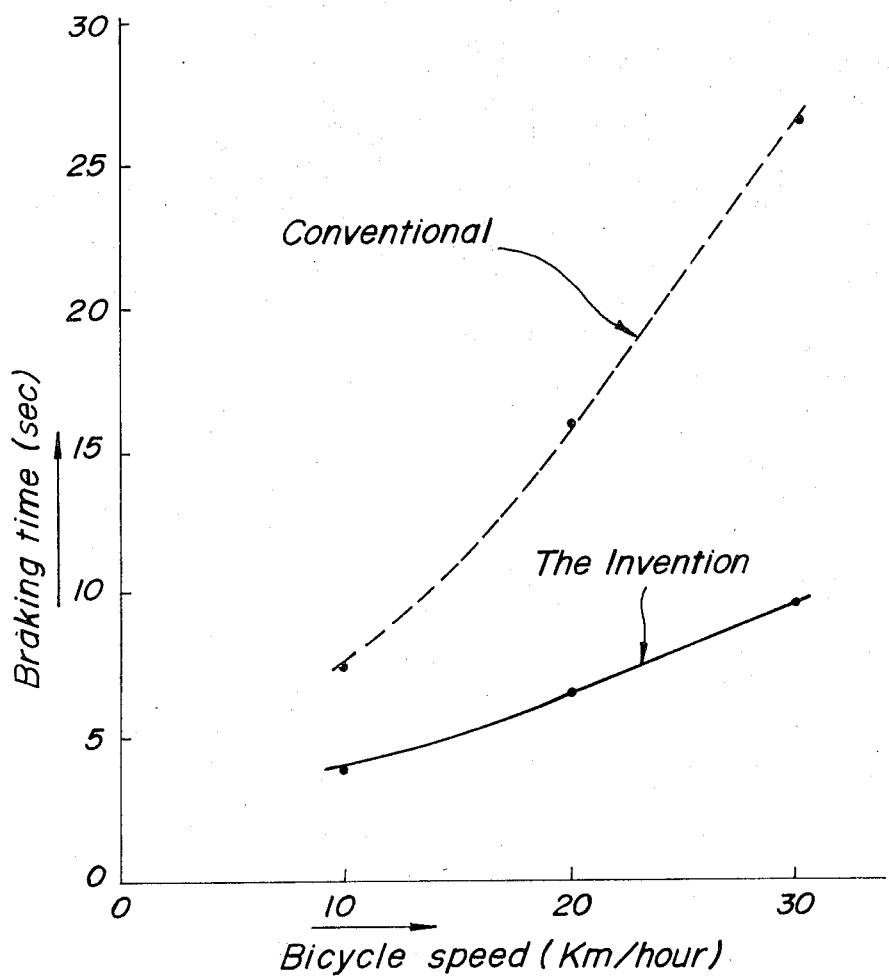

FRICTION PIECE FOR BICYCLE RIM BRAKES

This is a continuation-in-part of Ser. No. 227,467, filed Feb. 18, 1972, which is a continuation of Ser. No. 4,343, filed Jan. 20, 1970, now abandoned.

BACKGROUND OF THE INVENTION

1. Field of the Invention

This invention relates to a friction piece for bicycle rim brakes, and more particularly to a rubber friction piece having a planar friction surface and a plurality of lateral holes each including a planar peripheral edge surface portion extending in parallel to the friction surface with a spacing therefrom.

2. Description of the Prior Art

Conventional friction pieces for bicycle rim brakes have a shortcoming in that, when being wetted with water, their braking power is greatly reduced as compared with that when being dry. For example, when four frictional pieces are used, in total, at the front and rear wheels of a bicycle, the wet braking power is in a range of 0.11G to 0.204G (G being the terrestrial gravitational attraction).

In view of the fact that the braking power of commonly used automobile brakes is 0.4G or larger, it is rather dangerous to allow automobiles and bicycles to run on a road side-by-side with different braking powers. One way of eliminating such danger is to increase the braking power of bicycle under wet conditions. An object of the present invention is to meet such need of improving the wet braking power of bicycles.

Known friction pieces for bicycle rim brakes are in the form of blocks made of natural or synthetic rubber, and drain undulations or drain ridges are formed on that surface of the friction pieces which come in contact with the bicycle rim, for the purpose of draining water from the contact surface between the friction piece and the rim. With such drain undulations or ridges, however, the braking power of the friction pieces cannot be improved to a desired level.

A number of studies have been made on different materials for the friction pieces, but no new material has been found yet which is better than natural or synthetic rubber in dry braking power and abrasion resistance.

For instance, U.S. Pat. No. 1,716,090, which was patented to c. d. Schmidt on June 4, 1929, discloses a lining for brakes, clutches and the like comprising a unitary strip of material for attachment to the brake and having a flat braking surface and one face formed by relatively resilient less dense material and the opposite face of relatively dense less resilient material. Schmidt has disclosed only one material for his lining, which is asbestos woven yarn interwoven with brass or metallic wires. The asbestos woven yarn is not suitable for application to bicycles, because the bicycle rim brake friction pieces are directly exposed to different outdoor weather conditions, especially to rain, and the physical properties of the asbestos woven yarn are susceptible to drastic change when the ambient conditions vary from dry state to wet state, e.g., rain or snow. More particularly, when the asbestos woven yarn is wet, it almost completely loses its braking power. Furthermore, bicycle rim brake friction pieces must be made of an elastomer having a high hardness, so as to maintain a satisfactory braking power and a high abrasion-resistance under wet or raining conditions. It is well known that the brake lining made of asbestos woven yarn does not have any elastic properties which is suitable for use with bicycles under raining conditions. Besides the material, the structure of the lining of Schmidt is not suitable for bicycle, because the Schmidt's lining is difficult to securely hold on a simple brake mechanism of the bicycle while keeping its braking surface in satisfactorily operative conditions.

Accordingly, it is a current practice to make a bicycle rim brake friction piece with a rubber material after testing various properties thereof, such as hardness, coefficient of friction, and abrasion-resistance. The rubber material includes natural or synthetic rubbers of different compositions, and most suitable material is selected from the currently available rubber materials based on the result of the tests.

The reasons for the aforesaid loss of braking power of known friction pieces upon wetting are believed to be due to those properties of water which are detrimental to braking power, such as large specific heat, large intermolecular force, and large surface tension.

It is, however, noticed that the degree of reduction of braking power of wet friction pieces varies considerably, depending on the shape of the individual friction pieces.

SUMMARY OF THE INVENTION

Therefore, an object of the present invention is to obviate the aforesaid difficulties of known friction pieces by providing a friction piece which has an elasticity of composite nature, so as to minimize the amplitude of vibration of the friction piece when being urged against a bicycle rim. The reduction of the vibration amplitude results in an improvement of the braking power of the friction piece. To this end, three or more lateral holes are bored in the friction piece in the proximity of a planar frictional contact surface thereof, which holes are parallel with each other at right angles to relative movement of the friction piece and a bicycle rim on which the friction piece acts. The inventor has found specific shape and disposition of the lateral holes in the friction piece, for maximizing its brake power under wet conditions.

The friction piece of the present invention has the planar frictional contact surface, but not any undulation on its contact surface.

BRIEF DESCRIPTION OF THE DRAWING

For a better understanding of the invention, reference is made to the accompanying drawings, in which:

FIGS. 1A and 1B are schematic sectional views of two different frictional pieces for bicycle rim brakes, respectively;

FIG. 2 is a diagrammatic illustration of the vibration of a friction piece during braking action thereof;

FIG. 3 is a graph of braking efficiency, illustrating the vibration of the braking efficiency during infinitesimal time intervals;

FIG. 4 is a perspective view of a friction piece according to the present invention;

FIGS. 5A, 5B, and 5C are an elevation, a plan view, and a side view of the friction piece, respectively;

FIG. 6 is a perspective view of another friction piece according to the present invention;

FIGS. 7A and 7B are an elevation and a sectional view of a friction piece having holes bored in a staggered fashion, respectively; and FIG. 8 is a graph, showing the result of performance tests of the friction piece of FIGS. 7A and 7B.

DETAILED DESCRIPTION OF THE PREFERRED EMBODIMENTS

Referring to FIGS. 1A, 1B, and 2, a friction piece 1 for bicycle rim brake, which is supported by a base plate 2, is engageable with the surface of a rim 3 of the bicycle. The friction piece 1 of FIG. 1A is made of homogeneous solid material, while the friction piece 1 of FIG. 1B consists of two portions 1a and 1b made of different materials with different elastic constants, respectively.

In comparing the friction pieces of FIGS. 1A and 1B, if the material for the friction piece 1 of FIG. 1A and that for the portion 1a of the friction piece 1 of FIG. 1B are the same, the braking power of the friction piece 1 of FIG. 1A is smaller than that of FI. 1B. The reasons for the difference of the braking power between the two constructions are as follows.

Referring to FIG. 2, if the friction piece 1 is forced to engage a rotating rim 3 by an urging force W, a certain point A on that surface of the friction piece 1, which is in contact with the rim 3, moves to a position B by the friction force acting thereon. At the point B, the elastic stress within the friction plate 1, or the restoring force thereof, balances the frictional force acting on the point A. If the restoring force surpasses the frictional force, the point A of the friction piece 1 returns to a position C or the original stationary position of the point A. Thereafter, when the frictional force again surpasses the restoring force at the position C or A, the point A resumes its movement toward the position B. It should be noted here that the restoring force of the friction piece 1 balances a statical friction force between the rim 3 and the point A of the friction piece 1, while the frictional force acting on the point A during the return movement is a dynamical friction force therebetween. Since the dynamical friction force is usually smaller than the statical friction force, the return movement of the point A is not hampered by the dynamical friction between the friction piece 1 and the rim 3, at least in the beginning of the return movement. Thus, the point A of the friction piece 1 vibrates with an amplitude equivalent to the distance BC or BA. Similarly, all the points on the contact surface vibrates. The presence of such vibration has been known in the art.

The magnitude of the vibration of the friction piece depends directly on the effective coefficient of friction of the friction piece 1, as illustrated in FIG. 3. This is because the fact that the amplitude of the vibration for a large effective value of the coefficient of friction is smaller than that for a small effective value of the coefficient of friction.

The friction piece 1 of FIG 1B consists of two materials 1a and 1 b with different elasticities. With the discontinuity of the materials, the effective value of the coefficient of friction of such composite friction piece of FIG. 1B is usually larger than that of the solid friction piece of FIG. 1A. Accordingly, the amplitude of the aforesaid vibration of the friction piece of FIG. 1B becomes smaller than that of the solid friction piece of FIG. 1A. As a result, the braking power of the friction piece of FIG. 1B is larger than that of FIG. 1A.

The degree of reduction in the frictional resistance of the friction piece 1, in response to wetting with water, depends on the shape of the frictional contact surface of the friction piece 1. Generally speaking, if a liquid material is present between the surface of rubber-like friction piece and the metal surface of the rim, the so-called hydroplane phenomenon takes place, unless some suitable measures are provided to release the trapped liquid between the contact surfaces of the friction piece and the rim. As well known to those skilled in the art, once the hydroplane phenomenon occurs, the braking power does not increase in proportion with the urging force W of friction piece. In order to prevent the hydroplane phenomenon, conventional friction piece has undulations or drain ridges formed on the contact surface thereof. With such undulations or drain ridges, the trapped water can be drained, but the amplitude of the vibration of the friction piece increases. Thus, the increase of braking power by the drainage of trapped water is substantially cancelled by the loss of braking power by the increased vibration. As a result, the overall performance characteristics of the friction piece cannot be improved to any noticeable extent by the provision of such undulations or drain ridges.

Therefore, the present invention intends to provide a friction piece with an elasticity of composite nature without forming any undulations on the outer surface thereof, whereby the amplitude of the vibration of the friction piece upon actuation is minimized to improve the braking power thereof.

FIGS. 4 to 5C illustrate a friction piece for bicycle rim brakes, according to the present invention. In the figures, a friction piece body 4 is made by shaping natural or synthetic rubber, and a plurality of lateral holes 6 are bored in parallel with each other through the body 4 in the proximity of a frictional contact surface 5, which is planar and engageable with a bicycle rim. The lateral holes 6 are disposed at right angles to the longitudinal direction of the friction piece body 4 with uniform spacings between each other. With such lateral holes, the elasticity of the friction piece body 4 becomes composite in nature.

In order to ensure satisfactory operation of the friction piece, the body 4 must be made of natural or synthetic rubber having a Shore A hardness of 55° to 90°. When the body 4 is made of too soft rubber, namely, with a rubber whose Shore A hardness is less than 55°, the friction piece wears too fast and it is not economical. On the other hand, if the rubber is too hard, namely more than 90° in terms of Shore A hardness, the bicycle rim tends to slip over the contact surface 5 of the friction piece 4 and the desired braking action cannot be achieved. The width w of the friction piece 4 taken at right angles to the direction of relative movement of the rim and the body 4 can be determined so as to suit the conditions of each application, depending on the size of a bicycle tire rim with which the friction piece is used. The inventor has tested the braking actions of the friction pieces of various lengths $l$. taken in the moving direction of the rim relative to the friction body 4. As a result, it has been found that the length $l$ should not be smaller than 3 times the width $w$ of the contact surface 5. If the length $l$ is smaller than $3w$, the desired composite effect of the different elasticities of the bored and non-bored portions of the body 4 cannot be achieved, so that the braking effect is not so good.

Being a bicycle rim brake friction piece, the body 4 must be securely mounted on a simple bicycle brake mechanism. For this purpose, at least the lower one third portion of the body 4 should be kept solid without any holes bored therethrough. Accordingly, the distance $d$ from the contact surface 5 to the furthest edge of the hole 6 should not exceed two thirds of the height $h$ of the body, taken at right angles to the contact surface 5.

To ensure the composite distribution of the elasticity in the proximity of the contact surface 5, the size of the hole 6 and the distance between the adjacent holes 6 must be properly chosen. With the aforesaid limitation on the distance $d$ between the contact surfae 5 and the furthest edge of the hole 6, the magnitude of the hole 6 is restricted. The inventor has found that, if the spacing $p$ between the central axes of the adjacent holes 6 is greater than the width $w$ of the contact surface 5, the effect of the holes 6 is so reduced that the desired composite distribution of the elasticity in the proximity of the contact surface 5 cannot be obtained. It is also a finding of the inventor that the number of the holes 6 should be more than 3, because only one or two holes in the body 4 are not sufficient for achieving the composite distribution of the elasticity which is necessary for the improved wet performance of the friction piece.

Test results indicate that, if a planar edge is formed in each hole 6 in parallel with the contact surface 5, the braking action of the friction piece under wet conditions can be remarkably improved. Accordingly, each hole 6 is provided with a planar portion 6a, which is formed in the closest edge thereof to the contact surface 5 in parallel thereto, as shown in FIGS. 4 and 5A. At least 2 mm of the rubber material should be left between the planar edge 6a and the contact surface 5, for preventing excessively fast wearing of the friction piece 4.

FIG. 6 illustrates another friction piece body 4, according to the present invention. This friction piece is provided with lateral triangular holes 6 each having a side 6a formed in parallel with a planar contact surface 5, but the holes 6 do not penetrate through the body 4. More particularly, the lateral holes alternately extend from either of the two opposing longitudinal surfaces into the body 4 but terminate before reaching the opposing surface of the body 4. Thus, the lateral holes 6 of the last mentioned friction piece are disposed in a staggered fashion. With such staggered lateral holes 6, the elasticity of the friction piece body 4 of FIG. 6 becomes more composite in nature than that of the preceding embodiment as shown in FIG. 4.

FIGS. 7A and 7B illustrate another preferred embodiment of the invention, in which each hole 6 has a cross section consisting of a part of circle and a chord 6a of the circle. The chord portion 6a of the hole 6 is disposed in parallel to the contact surface 5, as can be seen from the figure. A test sample of the friction piece of FIGS. 7A and 7B was prepared with the following dimension by using a hard rubber with a Shore A hardness of 80°–90°.

| Width $w$ | 12 mm |

| -Continued | |
| --- | --- |
| Length $l$ | 42 mm |
| Height $h$ | 14 mm |
| Hole space $p$ | 8 mm |

A reference test sample of non-holed friction piece of conventional structure was prepared. Braking time of the two test samples was measured under wet conditions, by using a test machine. What is meant by the "braking time" is the number of seconds from the application of the brake to the complete stop of a test tire. The test tire was rotated at 80, 160, and 240 r.p.m., which correspond to bicycle running speeds of 10, 20, and 30 Km/hour, respectively, prior to the application of the brake. The force applied to the friction piece was 18 Kg. The results are shown in FIG. 8.

As apparent from FIG. 8, with the friction piece of the present invention, the braking time can be reduced to less than one half of that with a conventional friction piece. If it is assumed that braking distance, in terms of meters from a position where brake is applied to a position where the bicycle stops, is proportional to the square of the braking time in seconds, then the friction piece of the present invention can theoretically reduce the braking distance to much less than one half as compared with a conventional friction piece, under wet conditions. The inventor's field tests under wet conditions confirmed such reduction of the braking distance.

As described in the foregoing, the friction piece of the invention consists of a body 4 having a planar frictional contact surface 5 and made of a uniform rubber material except lateral holes 6, and the elasticity of the body 4 varies in a highly complicated manner or in a composite fashion due to the presence of the lateral holes 6 underneath the frictional contact surface 5. At the same time, the contact pressure at the contact surface 5 is not uniform but varies in a complicated fashion, depending on the disposition of the lateral holes 6 and the elasticity of the rubber material of the body 4. Especially, in the case of the embodiments of FIGS. 6 and 7A, 7B, the staggered disposition of the lateral holes 6 results in a complicated distribution of the elastic constants and frictional pressure on the contact surface 5. As a result, the amplitude of the vibration of the friction piece during the braking action is reduced, and the braking power is improved.

Salient features of the present invention are as follows.

i. The friction piece of the invention has a large effective value of the coefficient of friction, because the elasticity of the friction piece on the contact surface is of composite nature due to the presence of the lateral holes in the proximity thereof. In fact, the amplitude of the vibration of the friction piece is reduced so that a large braking power is ensured.

ii. The contact pressure between the friction piece and the bicycle rim is unevenly distributed on the contact surface of the friction piece due to the presence of the lateral holes. This unevenness of the contact pressure seems to enhance the apparent value of the coefficient of friction of the friction piece under wet conditions.

iii. The friction piece body can be formed by selecting proper material having a large frictional coefficient and a high abrasion resistance. Whereby, a high durability of the friction piece can be achieved.

iv. With the friction piece of the invention, a reliable braking action can be ensured even under wet or rainy conditions by the use of a planar contact surface of the friction piece with a coacting bicycle rim. The combination of the planar contact surface and the lateral holes results in a better wet braking action than that with a conventional braking contact surface with an undulation.

I claim:

1. A friction piece for bicycle rim brake, consisting of a substantially rectangular elongated body made of homogeneous resilient elastomer having a Shore A hardness of 55° to 90°, said body comprising a braking surface which is frictionally brakingly engageable with a bicycle rim, and at least three parallel lateral holes which are bored in the body at the proximity of the braking surface, said lateral holes extending at right angles to the direction of relative movement between the friction piece and the bicycle rim, the length $l$ of said friction surface in the direction of said relative movement being at least three times the width $w$ of the friction surface at right angles to the direction of said length, the height $h$ of the body at right angles to said braking surface being longer than said width $w$, the longitudinal central axes of said lateral holes lying on a plane which is parallel to said braking surface, the spacing $p$ between adjacent lateral holes being smaller than said width $w$, the distance $d$ from said braking surface to a farthest peripheral point of said lateral hole therefrom being less than two thirds of the height $h$ of the body, each of said lateral holes having a planar peripheral portion which is closest to and parallel with the braking surface with a spacing of more than 2 mm therefrom prior to the frictional wear of the body.

2. A friction piece according to claim 1, wherein said lateral holes extend through the body from one side wall to the opposing side wall.

3. A friction piece according to claim 1, wherein said lateral holes include two groups consisting of a first group of lateral holes extending from one side wall by a distance which is about one half of the width $w$, and a second group of lateral holes extending from the opposing side wall by a distance which is also about one half of the width $w$, the first group of lateral holes being offset from the second group of lateral holes in the direction of the length $l$ by a distance which is about one half of the spacing $p$.

4. A friction piece according to claim 1, wherein the cross section of the body taken at right angles to the direction of said length $l$ being trapezoidal.

5. A friction piece according to claim 1, wherein each of the lateral holes has a triangular cross section.

6. A friction piece according to claim 1, wherein each of the lateral holes has a rectangular cross section.

7. A friction piece according to claim 1, wherein each of the lateral holes has a cross section consisting of a part of a circle and a chord thereof.

* * * * *